United States Patent [19]

Petzold

[11] 3,746,829
[45] July 17, 1973

[54] PROCESS FOR CONTROLLING SPOT WELDING AND NON-DESTRUCTIVE TESTING OF SPOT-WELDED JOINTS

[75] Inventor: Jürgen Petzold, Wolfsburg, Germany

[73] Assignee: Volkswagenwerk Aktiengesellschaft, Wolfsburg, Germany

[22] Filed: Feb. 22, 1971

[21] Appl. No.: 117,309

[30] Foreign Application Priority Data
Mar. 7, 1970    Germany.................. P 20 10 878.5

[52] U.S. Cl. ............................. 219/110, 219/108
[51] Int. Cl. .................................. B23k 9/10
[58] Field of Search................. 219/110, 109, 108, 219/114, 112, 111, 131 R

[56] References Cited
UNITED STATES PATENTS

| | | | |
|---|---|---|---|
| 3,575,572 | 4/1971 | Levinge | 219/110 |
| 3,573,421 | 4/1971 | Vanderhelst | 219/110 |
| 3,433,921 | 3/1969 | Peterson | 219/110 |
| 3,582,967 | 6/1971 | Beckman et al. | 219/110 X |
| 3,586,815 | 6/1971 | Eijnsbergen et al. | 219/110 |
| 3,588,438 | 6/1971 | Vanderhelst | 219/110 X |
| 3,068,350 | 12/1962 | Archer | 219/110 |
| 3,509,311 | 4/1970 | Noble et al. | 219/109 |

Primary Examiner—J. V. Truhe
Assistant Examiner—Gale R. Peterson
Attorney—Ernest F. Marmorek

[57]    ABSTRACT

A process for controlling spot welding by adjusting the electric energy used for the welding in accordance with the gradient of the rising branch of the curve plotting the electric resistance as a function of time. This process permits the maintenance of the overall welding time constant. At the same time the process permits non-destructive testing of a spot-welded joint by utilizing the gradient of the rising branch of the curve representing the welding resistance as a function of time. This gradient then indicates the quality of the spot weld.

6 Claims, 3 Drawing Figures

Patented July 17, 1973 3,746,829

INVENTOR:
Jürgen Petzold,
BY
His Attorney.

PROCESS FOR CONTROLLING SPOT WELDING AND NON-DESTRUCTIVE TESTING OF SPOT-WELDED JOINTS

BACKGROUND OF THE INVENTION

This invention relates generally to a process for controlling spot welding and particularly relates to a spot-welding control as well as to a nondestructive testing process for spot-welded joints.

It is well known that the quality of a spot-welded joint depends on various parameters. Among these parameters are the magnitude of the electric current, the time of welding as well as the force with which the electrodes are pressed against the parts to be welded, as well as other parameters related to geometric relations such as the diameter of the electrodes and the thickness of the parts to be joined by welding. It is conventional practice to test the quality of the spot-welded joint by investigations carried out on the finished welded joint. This results in a destruction of the welded joints and hence of the work. Such investigation consists, for example, in torsion or shearing strain tests, or uncoiling of the weld, or else in the preparation of a metallographic section or the evaluation of the magnitude of the welding lens or spot.

However, such investigations have the basic disadvantage that the work piece is destroyed in order to check the quality of the weld. Furthermore, such a quality control which takes place after the manufacture of the welded joint prevents a timely change of the production process. This makes it impossible to vary, for example, the welding parameters to achieve an improvement of the welded joint just investigated.

Accordingly, it has been attemped to control spot-welded joint during the welding process itself. This would dispense with a subsequent test or even a non-destructive test after the welding process is finished in order to control or supervise the welding process. It should be noted that particularly the control of a spot-welding process has been attempted. Here advantage is taken of the movement of the electrodes during the welding process and other processes include an ultrasonic test. Still others make use of the changes of the electric resistance between the welding electrodes as a function of time in order to obtain an indication of the quality of the welded joint.

It is, accordingly, an object of the present invention to provide a process for controlling the quality of a spot-welded joint during the welding process.

Another object of the invention is to provide a process of the type referred to where the welding time remains constant to facilitate automation thereof while controlling the electric energy fed to the welding electrodes.

A further object of the invention is to provide a nondestructive testing process for a sport-welded joint where use is made of a particular portion of the curve of the electric resistance as a function of time to determine the quality of the joint.

SUMMARY OF THE INVENTION

The invention utilizes the last named principle. Accordingly, the invention relates to a spot welding process including the generation of a control value or signal in accordance with the change of the electric resistance between the welding electrodes as a function of time. A process of this type is known from a publication by Milcke which appears in the magazine "Schweissen und Schneiden," 1967, Number 4. However, in this known process the falling branch of the resistance vs. time curve is utilized. This yields a signal which is used to vary the time of welding.

In contradistinction the process of the invention is characterized in that the gradient of the rising branch of the resistance vs. time curve is utilized as the control value or signal. Depending on this gradient the welding joint is controlled by variation of the electric energy fed to the welding electrodes while the welding time is maintained constant. The same control value may also be used in a non-destructive test process for evaluating the quality of spot-welded joints.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing in which:

Figure 1:
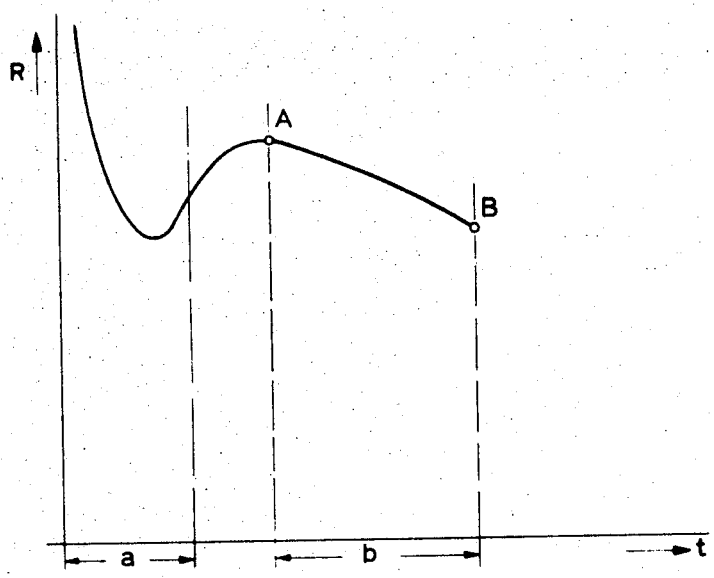
FIG. 1 is a curve illustrating the electric resistance R measured during the spot-welding of two pieces of sheet metal as a function of time $t$.
Figure 2:
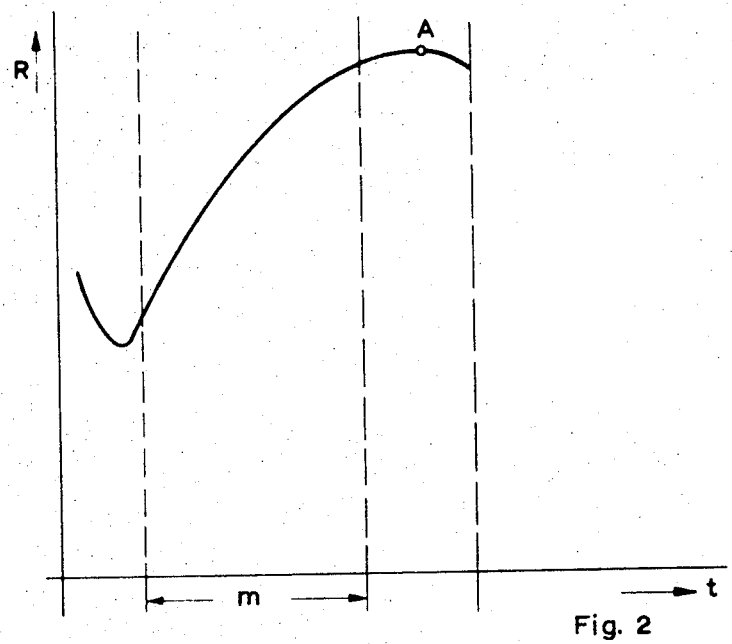
FIG. 2 is a curve, similar to that of FIG. 1 and again showing the electric resistance as a function of time but for two pieces of sheet metal provided with layers or coatings.

In order to explain the advantages of the invention over the known process reference is now made to FIGS. 1 and 2. These illustrate the electric resistance R between the welding electrodes as a function of the time $t$.

Considering first the resistance curve of FIG. 1 which is measured during the spot welding of steel sheets, there may be noted a range a where the resistance falls from a very high resistance value, determined in primarily the contact resistance, to a minimum value. Then after rising again the resistance reaches a maximum value A and thereafter falls again. An interesting point within the falling branch of the curve is shown at B. The known welding process which makes use of the variations of the resistance is characterized in that only the region between the points A and B, that is, a portion of the falling curve branch is used as the measuring region $b$.

This selection of the measuring region may cause difficulties when the parts to be welded exhibit a different shape of the electric resistance R as a function of the time $t$. This has been illustrated in FIG. 2 for the case of a layered sheet metal. It is immediately evident from an inspection of the curve that after the maximum value A there is practically no falling branch during the welding time which might be used for the measurement. The known process therefore requires a characteristic resistance curve according to FIG. 1. Further, the actual welding time must be longer than the time period designated a in FIG. 1 where no measurement can take place because the shape of the curve is primarily determined by external influences such as the contact resistance.

Furthermore, according to the known process the welding time is controlled or regulated in dependence upon the measuring result so that the welding process must be arranged for freely variable welding times. Fixed welding times, however, are preferred for automatic plants; they can not be maintained for the known process.

DESCRIPTION OF THE PREFERRED EMBODIMENT

The invention is based on the recognition that the above mentioned disadvantages of the known process such as limitation to materials having a certain resistance vs. time curve and variable welding time can be avoided by utilizing the gradient of the rising region of the resistance curve that is the region $m$ of the rising branch of the curve of FIG. 2. This gradient is determined by the magnitude of the electric energy fed to the welding lens which in turn determines the quality of the spot weld.

Up to now the invention has been described as a spot welding process including the generation of a control value or signal. However, the invention may just as well be described as a non-destructive test process for a spot welded joint where the change of the electric resistance between the welding electrodes as a function of time is used as a measure of the quality of the joint. In this connection the invention may also be characterized in that the gradient of the rising region of the resistance curve, for example, may be used in such a manner as a criterium for the quality of the joint that the electric energy fed to the welding lens, while the welding time is maintained constant, is controlled in dependence upon this gradient.

The resistance curve may be determined, as is well known, at the curve of the voltage between the welding electrodes where the magnitude of the current is known. This has the advantage that wear of the electrodes with an increasing number of welding joints made is also taken into consideration during the control of the energy fed to the electrodes. This results not only in the consistent quality of the welded joints but also results in an increase of the lifetime of the welding electrodes, particularly when welding layered sheet metal.

In accordance with the preferred embodiment of the invention where an impulse-like welding current is used, the gradient is formed or determined by comparison of the amplitudes of two predetermined resistance impulses caused by impulses of the welding current. In order to eliminate influences of the measuring result due to accidental variations of the resistance from one weld to another, there may be used advantageously a further development of the invention. This consists in the comparison of the mean values of the amplitudes of two series of predetermined resistance impulses caused by impulses of the welding current for obtaining the gradient.

According to another embodiment of the invention a continuous determination of the gradient may be carried out by comparing the amplitude of each resistance impulse with the immediately preceding impulse. This results in the possibility of a particularly rapid control of the welding process in case of disturbances.

As is known the applied electric energy may be influenced by a change of the relative phase or the starting phase of the welding current. However, in principle a control of the amplitude of the current is also possible.

The process of the invention will now be explained by means of the block diagram of FIG. 3 which illustrates apparatus for carrying out the process. A particular advantage of the process of the invention is the fact that known elements may be used for carrying out the process so that there is no need to discuss the details of the electrical elements forming the blocks of the diagram of FIG. 3.

Figure 3:
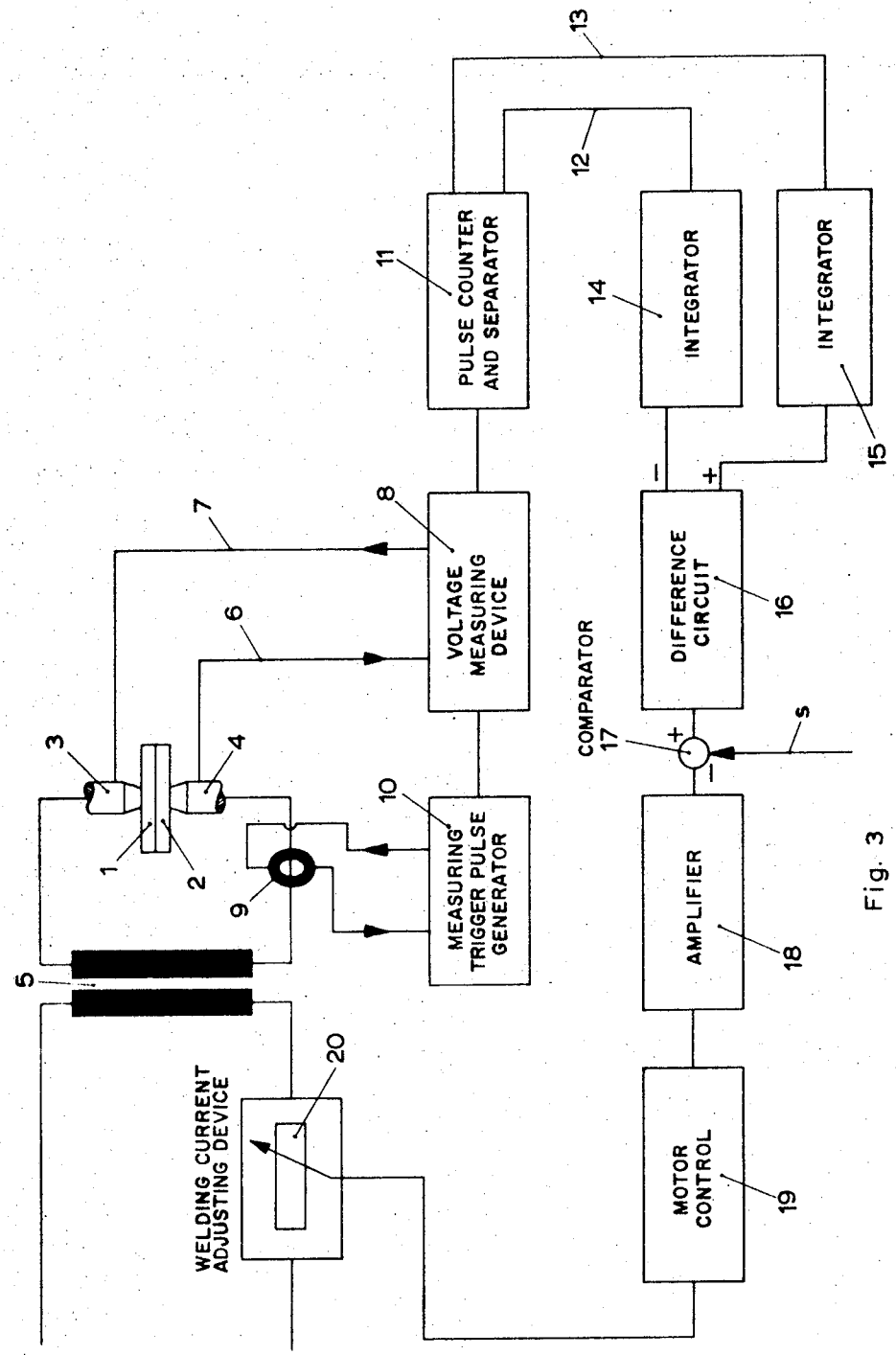
FIG. 3 is an electric diagram in block form illustrating apparatus for performing the welding control process of the invention.

Referring now to FIG. 3 there are illustrated two sheet metal pieces 1 and 2 which are to be joined by spot welding. Conventionally they are disposed between the two welding electrodes 3 and 4 which are supplied with energy by a welding transformer 5.

In order to determine the gradient of the time resistance curve between the electrodes 3 and 4 the voltage across the actual weld is applied by means of the measuring leads 6 and 7 to the voltage measuring device 8. The measurement takes place at precisely determined times within the rising region of the predetermined time-resistance response curve, as it it will be explained below. At the measuring point or time interval there is added to the voltage drop corresponding to the resistance to be determined an induction voltage which is generated by induction due to the phase shifted current impulse. Accordingly, this voltage measurement must be carried out at such times where the current impulse in the welding circuit has its maximum value because at that time the induction voltage has a minimum value. To this end by means of the inductive device 9 which may be an inductive ring there is controlled the measuring trigger impulse generator 10 which in turn triggers the voltage measuring device 8 so that the voltage drop is measured only at such times when the induced welding voltage is minimum.

The output of the voltage measuring device 8 is fed to the impulse counter 11 having two outputs the function of which will be also explained in the following paragraph. This measuring apparatus does not measure a resistance value by utilizing an individual voltage impulse. In order to eliminate disturbances it determines statistically a mean value from a predetermined number of impulses which is processed by the impulse counter 11.

In order to determine the gradient within the rising curve branch it is necessary to carry out a voltage measurement within the measuring range m of FIG. 2 at two different measuring times which are determined by the measuring trigger impulse generator 10. Therefore two sets of impulses spaced apart from one another within the range of interval m, are fed from the two outputs of counter 11, by leads 12 and 13 respectively to one of the integrators 14 and 15. In each of the two integrators a mean value of one of the sets of impulses is formed. In the difference circuit 16 the two means values are subtracted. The resulting difference in turn is compared in the comparator 17 with a desired value s for the gradient of the resistance curve. According to the difference determined in the comparator 17, a motor control 19 is activated via an amplifier 18 in order to control a variable impedance element 20. As shown in FIG. 3 the motor control 19 varies by means of the current potentiometer or variable impedance element 20 the relative phase of the welding current in such a manner that the deviation from the value s as measured by the comparator 17 is caused to vanish.

With respect to the measuring apparatus schematically shown in FIG. 3, the following articles disclose well known devices which can be employed here:

The "Philips Industrie Elektronik" on its page 107, shows a universal impulse generator PP 1122 which can be employed as measuring trigger impulse generator 10.

The "Elektronik," 1968, No. 7 shows an embodiment which can be employed as the voltage measuring device 8.

The "Digital Construction Elements," Series 10, of the Volvo Company, discloses a unit constituting one channel in the optional pulse counter and separator 11.

The "Elektronik," May 1965, No. 5, discloses in FIG. 7 thereof generators 14 and 15 and, in FIG. 10 thereof, the difference circuit 16 and comparator 17.

The Data Sheet 66271-A of The Helipot Division of Beckman Industries shows motor-pot modules of Helipot which can be employed as motor control 19.

The Helipot Bulletin 964-5 of Beckman Industries discloses a complete servo system including the motor control 19 and the adjusting device 20.

In principle it is also possible, instead of varying the current potentiometer, to act in another manner on any element which can be used to vary the relative phase of the welding current.

As will be evident from the description of FIG. 3 the integrators 14 and 15 must store the respective mean values until the difference is formed in the difference circuit 16.

A further advantage of the process of the invention is in that it may also be used for very short welding times wherein by very high currents and during short welding times a sufficient weld is generated because the resistance rise can still be measured.

Since the shape of the electric resistance curve varies statistically for successive parts to be welded even if they are of the same material it is suitable to compare in the comparator 17 not a concrete and fixed desired value s but to provide a limited range of the desired values.

What is claimed is:

1. A process for controlling the spot welding of two work pieces between welding electrodes, comprising
   ascertaining a reference resistance gradient of the rising region of a reference time-response electricresistance curve during the time of welding which is necessary for producing an optimum weld between the two pieces, and
   during each subsequent welding,
   ascertaining the actual resistance gradient within the time limits of the rising region of said reference curve,
   applying the reference gradient and the actual gradient to comparing means thereby obtaining a differential therebetween, and
   varying the electric energy fed to the welding electrodes until said differential has substantially been reduced to zero value while maintaining the time of each welding substantially constant.

2. Process as defined in claim 1 wherein the determined by the change of the voltage between the welding electrodes.

3. Process as defined in claim 1 wherein the welding electrodes are fed with an impulse-like welding current and wherein said gradient deviation is determined by comparing the amplitudes of two predetermined resistance impulses within the range of the rising region of the time resistance curve, said resistance impulses being triggered by impulses derived from the welding current.

4. Process as defined in claim 3 wherein said gradient is determined by comparing the mean values of the amplitudes of two sets of predetermined resistance impulses which are triggered by impulses of the welding current at predetermined time intervals within the range of the rising region of the time resistance curve.

5. Process as defined in claim 1 where in the electric energy fed to the welding hugget is controlled by varying the relative phase of the welding current.

6. In a process for controlling the spot welding of two work pieces between welding electrodes, a non-destructive testing method for the spot-welded joints, comprising:
   determining during the welding an actual gradient of the rising region of the time-response curve of the resistance between the welding electrodes by measuring the amplitudes of the voltage between said electrodes at two different time points within said rising region of said curve on a voltage measuring device and producing the difference between said amplitudes in a difference circuit;
   comparing said difference with a predetermined reference value thereof and obtaining the deviation of said difference from said reference value;
   said deviation determining the quality of the welding joint.

* * * * *

UNITED STATES PATENT OFFICE
CERTIFICATE OF CORRECTION

Patent No. 3,746,829          Dated  July 17, 1973

Inventor(s)  JURGEN PETZOLD

It is certified that error appears in the above-identified patent and that said Letters Patent are hereby corrected as shown below:

Claim 1 should read as follows:

-- 1. A process for controlling a series of spot welding operations, each operation including welding together portions of a pair of work pieces between welding electrodes, the pairs of work pieces of the entire series having similar properties, comprising the steps of ascertaining once for the entire series a reference gradient of the rising region of a reference time-response curve of the electric resistance between the electrodes and the time limits of the rising region during the time of welding which is necessary for producing an optimum weld between the first pair of work pieces, and during each welding of subsequent pieces, ascertaining the actual resistance gradient within the time limits of the rising region of said reference curve, applying the reference gradient and the actual gradient to comparing means thereby obtaining a differential therebetween, and varying the electric energy fed to the welding electrodes until said differential has substantially been reduced to zero value while maintaining the time of each welding substantially constant.

Signed and sealed this 23rd day of April 1974.

(SEAL)
Attest:

EDWARD M.FLETCHER,JR.           C. MARSHALL DANN
Attesting Officer               Commissioner of Patents